US012565113B2

(12) United States Patent (10) Patent No.: US 12,565,113 B2
Salter et al. (45) Date of Patent: Mar. 3, 2026

(54) ELECTRIC VEHICLE CHARGING ARRANGEMENT

(71) Applicant: Ford Global Technologies, LLC, Dearborn, MI (US)

(72) Inventors: Stuart C. Salter, White Lake, MI (US); Ryan O'Gorman, Beverly Hills, MI (US); Ryan Edwin Hanson, Livonia, MI (US); Peter Phung, Windsor (CA); John Van Wiemeersch, Novi, MI (US)

( * ) Notice: Subject to any disclaimer, the term of this patent is extended or adjusted under 35 U.S.C. 154(b) by 321 days.

(21) Appl. No.: 17/938,458

(22) Filed: Oct. 6, 2022

(65) Prior Publication Data

US 2024/0116382 A1    Apr. 11, 2024

(51) Int. Cl.
B60L 53/60 (2019.01)
B60L 53/12 (2019.01)
B60L 53/14 (2019.01)
B60L 53/36 (2019.01)
B60W 60/00 (2020.01)
G06Q 10/02 (2012.01)
G07C 9/00 (2020.01)

(52) U.S. Cl.
CPC .............. B60L 53/60 (2019.02); B60L 53/36 (2019.02); G06Q 10/02 (2013.01); G07C 9/00182 (2013.01); B60L 53/12 (2019.02); B60L 53/14 (2019.02); B60W 60/001 (2020.02)

(58) Field of Classification Search
None
See application file for complete search history.

(56) References Cited

U.S. PATENT DOCUMENTS 8,710,798 B2    4/2014  Turner
9,379,559 B2    6/2016  O'Connell et al.
11,074,773 B1 *  7/2021  Morris ................... B60L 53/68
(Continued)

OTHER PUBLICATIONS

Khalil Salah, et al., Unificaiton Requirements of Electric Vehicle Charging Infrastructure, International Journal of Power Electronics and Drive System, vol. 7, No. 1, Mar. 1, 2016, 246-253.
(Continued)

Primary Examiner — Jeff Zimmerman
Assistant Examiner — Jorge G Del Toro-Ortega
(74) Attorney, Agent, or Firm — Emily Campbell; Eversheds Sutherland (US) LLP

(57) ABSTRACT

This disclosure is generally directed to systems and methods related to an electric vehicle charging arrangement. An example method executed by a first computer can include evaluating an agreement between a first party associated with an electric vehicle and a second party associated with a property in which the first computer can be located. The method can further include granting to a second computer of the electric vehicle, an authorization to permit the electric vehicle to enter the property of the second party during a time slot defined in the agreement; and granting, to the electric vehicle, access to an electric vehicle charging station on the property during the time slot defined in the agreement. The time slot, which is available for use on a repetitive basis over a stipulated period of time, can be outside of business hours of an activity performed by the second party on the property.

18 Claims, 6 Drawing Sheets

(56) References Cited

U.S. PATENT DOCUMENTS

| | | | | |
|---|---|---|---|---|
| 2015/0138001 | A1* | 5/2015 | Davies | G08G 1/146 |
| | | | | 340/932.2 |
| 2015/0226572 | A1* | 8/2015 | North | B60L 53/68 |
| | | | | 701/400 |
| 2018/0114437 | A1* | 4/2018 | Singh | G08G 1/04 |
| 2019/0205842 | A1* | 7/2019 | Starns | G05D 1/0088 |
| 2020/0074753 | A1* | 3/2020 | Adiga | G07F 17/244 |
| 2020/0111268 | A1* | 4/2020 | Montague | G06Q 30/0645 |
| 2020/0258388 | A1* | 8/2020 | Nakka | G08G 1/143 |
| 2020/0286363 | A1* | 9/2020 | Sobie | G08B 21/24 |
| 2021/0086647 | A1 | 3/2021 | Kiessling et al. | |
| 2021/0110446 | A1 | 4/2021 | Khoo et al. | |

OTHER PUBLICATIONS

Carlos Madina et al., Methodology for Assessing Electric Vehicle Charging Infrastructure Business Models, Science Digest, Elserier, Energy Policy 89 (2016), Dec. 14, 2015, 284-293.

* cited by examiner

ELECTRIC VEHICLE CHARGING ARRANGEMENT

BACKGROUND

It is sometimes undesirable to park a vehicle in front of a residence or on a road in a residential area, particularly when the vehicle is used for business purposes. In some cases, the vehicle can be an electric vehicle owned by a business and used by an employee for performing work during the day. It may be inconvenient and inefficient for the employee to drive the electric vehicle back to an employer facility (office, garage, parking lot, etc.) every evening after work, especially if the employer facility is located significantly far from a work spot.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
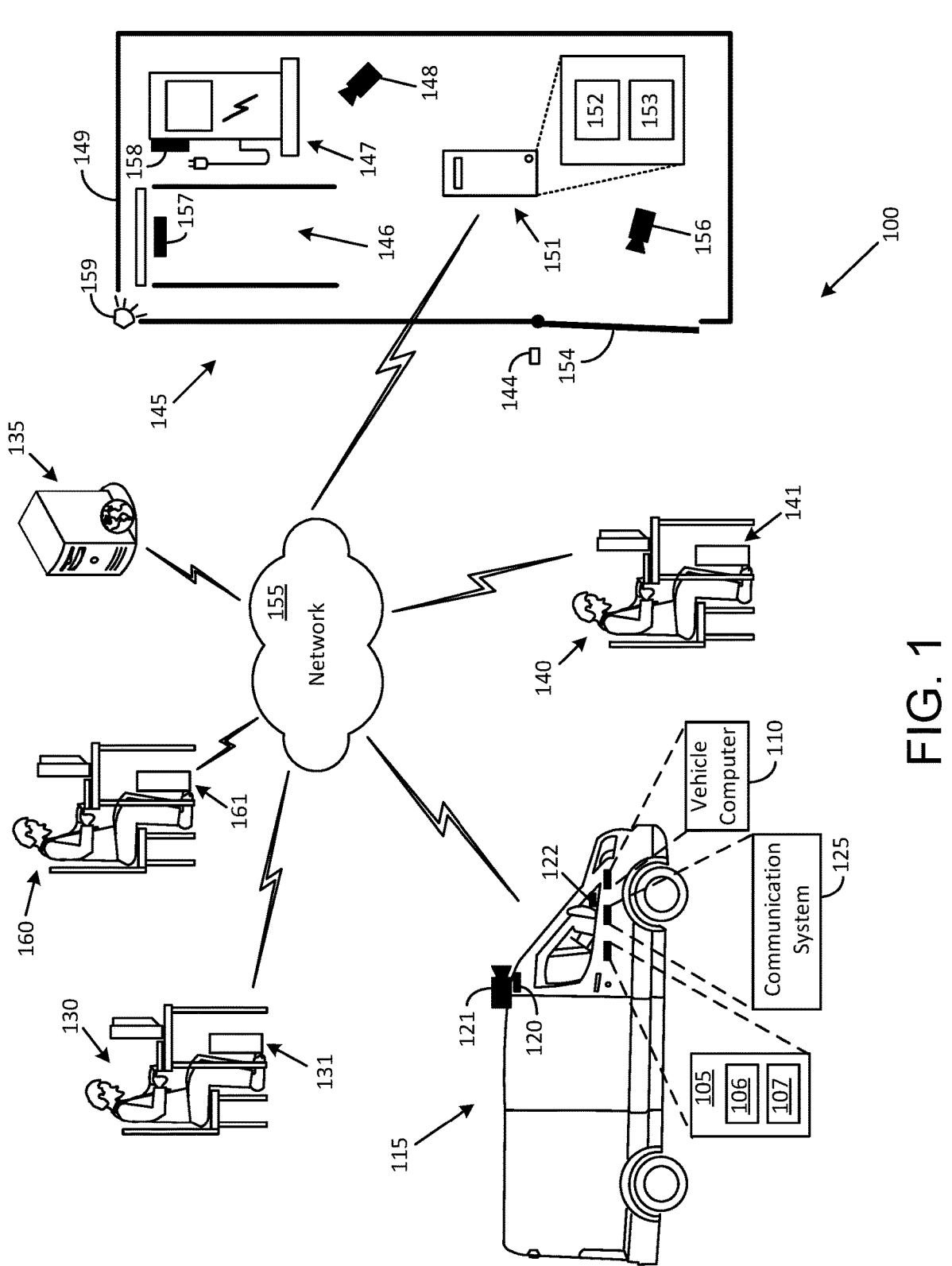
FIG. 1 illustrates an example electric vehicle charging arrangement system in accordance with an embodiment of the disclosure.

In terms of a general overview, certain embodiments described in this disclosure are directed to systems and methods related to an electric vehicle charging arrangement. In an example embodiment, a method executed by a first computer can include evaluating an agreement between a first party associated with an electric vehicle and a second party associated with a property in which the first computer is located. The method further includes granting to a second computer of the electric vehicle, an authorization to permit the electric vehicle to enter the property of the second party during a time slot defined in the agreement and granting, to the electric vehicle, access to an electric vehicle charging station on the property during the time slot defined in the agreement. The time slot, which is available for use on a repetitive basis over a stipulated period of time, can be outside of business hours of an activity performed by the second party on the property.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words, terms, and phrases that are used in this disclosure must be interpreted as referring to various objects and actions that are generally understood in various forms and equivalencies by persons of ordinary skill in the art. For example, the phrase "electric vehicle" as used herein refers to any of various types of battery-driven vehicles that may be generally referred to as an electric vehicle (EV) or a battery electric vehicle (BEV). The word "computer" as used herein refers to any of various types of computing devices containing a processor and a memory such as, for example, a desktop computer, a laptop computer, a tablet, and a personal device (smartphone, smartwatch, smart wearable, etc.). The word "agreement" as used herein must be interpreted as being substantially equivalent, or similar, to words such as "contract," "pact," "understanding," "treaty," and phrases such as a "memorandum of understanding." The phrase "charging an electric vehicle" as used herein must be understood to mean "charging a battery (or a battery system containing multiple batteries) of an electric vehicle." The word "sensor" as used herein includes any of various forms of sensing devices, detection devices, and image capture devices. The word "cooperate," as used herein with reference to two or more devices, refers to transfer of information between the devices. The word "information," as used herein with reference to a device, refers to any of various forms of data produced by the device such as, for example, digital data. It must be understood that words such as "implementation," "configuration," "application," "scenario," "situation," "case," and "situation" as used herein represent abbreviated versions of the phrase "In an example ("implementation," "configuration," "application," "scenario," "situation," "case," "approach," and "situation") in accordance with the disclosure." It must also be understood that the word "example" as used herein is intended to be non-exclusionary and non-limiting in nature.

FIG. 1 illustrates an example electric vehicle charging arrangement system 100 in accordance with an embodiment of the disclosure. The example electric vehicle charging arrangement system 100 can include a vehicle charging system computer 105 provided in an electric vehicle 115, a computer 131 associated with a first party, a computer 141 associated with a second party, a computer 161 associated with a third party, an onsite computer 151 located in a property 145, and a cloud computer 135. The electric vehicle 115 can be owned by an individual, leased by an individual, owned by a business entity, or owned by a commercial entity. In an example scenario, the electric vehicle 115 can be operated by an individual for business purposes. In another example scenario, the electric vehicle 115 can be a vehicle that is a part of a fleet of vehicles such as, for example, a rental vehicle that is part of a fleet of rental vehicles (Hertz®, Budget®, Avis®, Enterprise®, etc.), a ride-hail vehicle that is part of a ride-hail fleet (Uber®, Lyft®, etc.), a service vehicle that is part of a fleet of service vehicles (plumbing services company, electrical repair company, AC services company, construction company, etc.), or a utility vehicle that is a part of a fleet of utility vehicles (electric company, phone company, civil engineering services company, etc.).

In an example scenario, the electric vehicle 115 is a van that is driven by an employee of a utility company or is an autonomous vehicle that is used commercially for transporting passengers without involvement of a driver. The van may be loaded with various tools, equipment, and supplies that may be used by the driver of the van (and others) for performing tasks during a workday. In an example scenario, the workday may extend from around 8 AM to around 7 PM. During nighttime, it is desirable to charge the electric vehicle 115 so as to avoid doing so during the workday and affecting a work schedule of the driver.

The electric vehicle 115 can include a vehicle charging system computer 105 configured to enable charging of the electric vehicle 115 in accordance with an electric vehicle charging arrangement that is described below in more detail. The electric vehicle 115 can further include a vehicle computer 110, a sensor system 120, a global positioning satellite (GPS) system 122, and a communication system 125. The vehicle computer 110 may perform various functions such as, for example, controlling motion-related operations (speed, cruise control, braking, etc.), managing climate controls (air conditioning, heating etc.), detecting airbag activations, detecting component issues, detecting malfunctions, and issuing alerts (bulb out, low tire pressure, vehicle in blind spot, etc.).

The vehicle charging system computer 105 can include a processor 106 and a memory 107 in which is stored computer-executable instructions that are executed by the processor 106 to enable the vehicle charging system computer 105 to perform various operations in accordance with the disclosure. In an example configuration, the vehicle charging system computer 105 can be a standalone computer that is communicatively coupled to the vehicle computer 110 and other devices in the electric vehicle 115. In this configuration, the vehicle charging system computer 105 can obtain from the vehicle computer 110 and one or more of the other devices, information such as, for example, battery information (charge level, estimated mileage on remaining charge, etc.), location information of the electric vehicle 115, and motion-related status (stopped, speed of movement, etc.) of the electric vehicle 115. In another example implementation, the vehicle charging system computer 105 can be an integral part of the vehicle computer 110 and share some components with the vehicle computer 110, such as, for example a processor and a memory.

The sensor system 120, which is coupled to the vehicle charging system computer 105, can include various types of devices such as, for example, an accelerometer, a video camera, a digital camera, an infrared camera, an object detector, a distance sensor, a proximity sensor, an audio sensor, a light detection and ranging (LIDAR) device, a radar device, and/or a sonar device. In the illustrated example, a sensor in the form of a camera 121 is coupled to the vehicle charging system computer 105.

The camera 121 can be any of various types of image capture devices mounted at any of various locations on the electric vehicle 115 such as, for example, on a front bumper, on a hood, above a registration plate, a rear window, a rear bumper, or a trunk of the electric vehicle 115. The camera 121 is arranged to capture images of objects located around the electric vehicle 115. The images may be still images, video clips, or video streams.

The GPS system 122 may be communicatively coupled to the vehicle charging system computer 105 for providing location information of the electric vehicle 115.

The communication system 125 can include wired and/or wireless communication devices mounted in, or on, the electric vehicle 115 in a manner that supports various types of communications such as, for example, communications between the vehicle charging system computer 105 and the vehicle computer 110. The communication system 125 may utilize one or more of various wired and/or wireless technologies for this purpose, such as, for example, Bluetooth®, Ultra-Wideband (UWB), Wi-Fi, Zigbee®, Li-Fi (light-based communication), audible communication, ultrasonic communication, and/or near-field-communications (NFC).

The vehicle charging system computer 105 and the vehicle computer 110 can also utilize the communication system 125 to communicate with devices that are located outside the electric vehicle 115, such as, for example, the computer 131 associated with the first party, the computer 141 associated with the second party, the computer 161 associated with the third party, the onsite computer 151, and the cloud computer 135.

Communications between the vehicle charging system computer 105 in the electric vehicle 115 and the various other computers may be carried out via a network 155. The network 155 may include any one network, or a combination of networks, such as, for example, a local area network (LAN), a wide area network (WAN), a telephone network, a cellular network, a cable network, a wireless network, and/or private/public networks such as the Internet.

The network 155 may support one or more types of communication technologies such as, for example, Transmission Control Protocol/Internet Protocol (TCP/IP), Cellular, Bluetooth®, Ultra-Wideband, near-field communication (NFC), Wi-Fi, Wi-Fi direct, Li-Fi, vehicle-to-vehicle (V2V) communications, vehicle-to-infrastructure (V2I) communications, and vehicle-to-everything (V2X) communications.

In an example scenario, the computer 131 that is associated with the first party is owned by the first party and is used by an administrator 130 for executing various operations associated with an electric vehicle charging arrangement in accordance with the disclosure. The first party can be any of various entities such as, for example, an individual who owns the electric vehicle 115 or any other entity such as, for example, a business entity or a commercial entity, that owns, leases, rents, or is directly or indirectly involved in operations of a single electric vehicle or a number of electric vehicles.

In an example scenario, the first party can be a rental car company (Hertz®, Budget®, Avis®, Enterprise®, etc.), a ride-hail provider (Uber®, Lyft®, etc.), a services company (plumbing services company, electrical repair company, AC services company, construction company, etc.), or a utility company (electric company, phone company, civil engineering services company, etc.). The administrator 130 can be an employee of the company. The administrator 140 may either be the second party or an employee of the second party.

The computer 141 that is associated with the second party may be owned by the second party and used by an administrator 140 for executing various operations associated with an electric vehicle charging arrangement in accordance with the disclosure. The second party can be any of various entities owning one or more properties that include one or more electric vehicle charging stations. The various entities, can be, for example, an individual, a sole-proprietor of a business, or a business entity having a proprietary interest or ownership in one or more convenience stores, one or more gas stations, one or more restaurants, one or more hotels, one or more offices, one or more malls, and one or more strip malls. The administrator 140 may either be the second party or an employee of the second party.

The computer 161 that is associated with the third party can be a server computer that is either operated upon by an administrator 160 or can operate as an unattended server computer (with occasional human intervention for executing actions such as, for example, addressing faults, software updates, and performing repairs). It must be understood that the description herein with reference to actions performed by the administrator 160 can be identical to, or substantially similar to, actions performed autonomously by the computer 161 when operating as an unattended server computer.

The administrator 160 can be, for example, an employee of the third party, and may use the computer 161 for executing various actions associated with setting up, administering, and running, an electric vehicle charging arrangement in accordance with the disclosure. In an example scenario, the administrator 160 can be an employee of an agency, a company, a brokerage firm, an intermediary, or a contractor firm, and may use the computer 161 for tasks such as, for example, evaluating and matching the first party with the second party and setting up and executing the electric vehicle charging arrangement in accordance with the disclosure.

The cloud computer 135 is communicatively coupled via the network 155 to the onsite computer 151 as well as to various other devices such as the vehicle charging system computer 105, the computer 131, and the computer 141. A database of the cloud computer 135 may be used for storing various items associated with the electric vehicle charging arrangement system 100, including an agreement executed between the first party and the second party.

The onsite computer 151 may be located in the property 145 and can include a processor 152 and a memory 153 in which is stored computer-executable instructions that are executed by the processor 152 to enable the onsite computer 151 to perform various operations in accordance with the disclosure. The property 145 can be, for example, a business establishment or a commercial establishment, and the second party associated with the property 145 can be an individual having an ownership right to the property 145, a group of individuals having the ownership right to the property 145, a business entity having the ownership right to the property 145, or a commercial entity having the ownership right to the property 145.

The property 145 can include, for example, a convenience store, a gas station, a restaurant, a hotel, an office, a mall, a strip mall. The property 145 further includes one or more electric vehicle charging stations such as, for example, an electric vehicle charging station 147 that is located adjacent to a parking spot 146 in the property 145.

The property 145 can be enclosed by a perimeter fence 149 and entry into the property 145 may be provided via a gate 154. The perimeter fence 149 can be a geofence in some cases. In an example scenario, the gate 154 is controllable by a gate activation system (not shown) that is configured to open the gate 154 upon verification of a gate code entered into a gate keypad 144 located near the gate 154. The gate activation system can include one or more motors that are coupled to the gate 154.

The property 145 further includes a security arrangement that may include one or security devices such as, for example, the gate keypad 144, a camera 148, a camera 156, an object detector 157, a communication system 158 (wireless transceiver, speaker, microphone, display screen, intercom, etc.), and lights (a spotlight 159, for example). The camera 148 and/or the camera 156 can be, for example, a video camera, a digital camera, or an infrared camera. The object detector 157 can be arranged to detect various objects, such as, for example, a vehicle that is parked in the parking spot 146. The various devices that are a part of the security arrangement are configured to detect, track, and assist an authorized vehicle such as, for example, the electric vehicle 115, to enter the property 145 based on entry of the gate code, track the vehicle when moving inside the property 145, and assist a driver of the vehicle to reach and to use the electric vehicle charging station 147.

As indicated above, the first party that is associated with a vehicle or vehicles, can be an individual, a rental car company, a ride-hail provider, a services company, or a utility company, and the second party that is associated with a property or properties, can be an individual, a sole-proprietor of a business, or a business entity having a proprietary interest or ownership in one or more convenience stores, one or more gas stations, one or more restaurants, one or more hotels, one or more offices, one or more malls, and one or more strip malls.

In an example implementation, the first party executes an agreement with the second party that allows the first party to utilize one or more electric vehicle charging stations located in one or more properties of the second party on a repetitive basis during a specified time slot and over a stipulated period of time. The stipulated period of time can be, for example, a number of days, a number of days, a number of months, or a number of years, and the specified time slot can partially, or fully, correspond to a period of time during which a business activity that is performed by the second party on the property is closed to the general public. In an example case, the period of time corresponds to nighttime hours during which a business that is operating on the property 145 (such as, for example, a convenience store owned by the second party) is closed for business. The nighttime hours can extend, for example, from store closing time on one day (for example, store closing time of 10 PM on Monday) and store opening time on the following day (for example, store opening time of 9 AM on Tuesday). In another example case, the period of time can extend over several days when the store is closed, such as, for example, over a weekend from store closing time at 7 PM on Friday to store opening time at 8 AM on Monday.

In accordance with the agreement, an electric vehicle such as, for example, the electric vehicle 115 that is associated with the second party may enter the property 145 during the time slot defined in the agreement and use the electric vehicle charging station 147. It must be understood that description provided herein with respect to various actions performed by a driver of a vehicle can be executed by a computer of an autonomous vehicle. Thus, for example, a description related to an action such as, for example, a driver entering a gate code on a gate keypad can be carried out by the vehicle charging system computer 105 of the electric vehicle 115 wirelessly transmitting the gate code to the onsite computer 151 located in the property 145. Another action performable by a driver of the electric vehicle 115 pertains to coupling a charge cable of the electric vehicle charging station 147 to the electric vehicle 115. This action can be performed, for example, by a robotic arm provided in the electric vehicle 115. The robotic arm may be configured to couple a charging cable of the electric vehicle charging station 147 to a battery plug in the electric vehicle 115. In another example implementation, a charging pad may be embedded in the parking spot 146. The charging pad is coupled to the electric vehicle charging station 147 and allows wireless charging of the electric vehicle 115 (either driver operated or autonomous).

Entry of the electric vehicle 115 into the property 145 can be subject to authorization by the onsite computer 151 located in the property 145. The authorization may be granted by the onsite computer 151 after receiving, verifying, and authorizing a gate code that is entered into the gate keypad 144 by a driver of the electric vehicle 115. Details pertaining to the gate code may be saved in a database of the onsite computer 151 and/or of the cloud computer 135.

Passage of the electric vehicle 115 through the gate 154 and entry into the property 145 may be detected by the onsite computer 151 based, for example, on evaluating images provided to the onsite computer 151 by the camera 156. The onsite computer 151 may then assist the driver of the electric vehicle 115 to locate the electric vehicle charging station 147. The assistance may be provided in various ways such as, for example, by wirelessly transmitting movement guidance to an infotainment system (not shown) in the electric vehicle 115 (via the communication system 125 of the electric vehicle 115). The driver may listen to the movement guidance via a speaker of the infotainment system and/or observe visual cues displayed on a display screen of the infotainment system (a map of the property 145, for example). Additional details pertaining to operations performed by the onsite computer 151, the driver of the electric vehicle 115, and other objects shown FIG. 1 are provided below.

Figure 2:
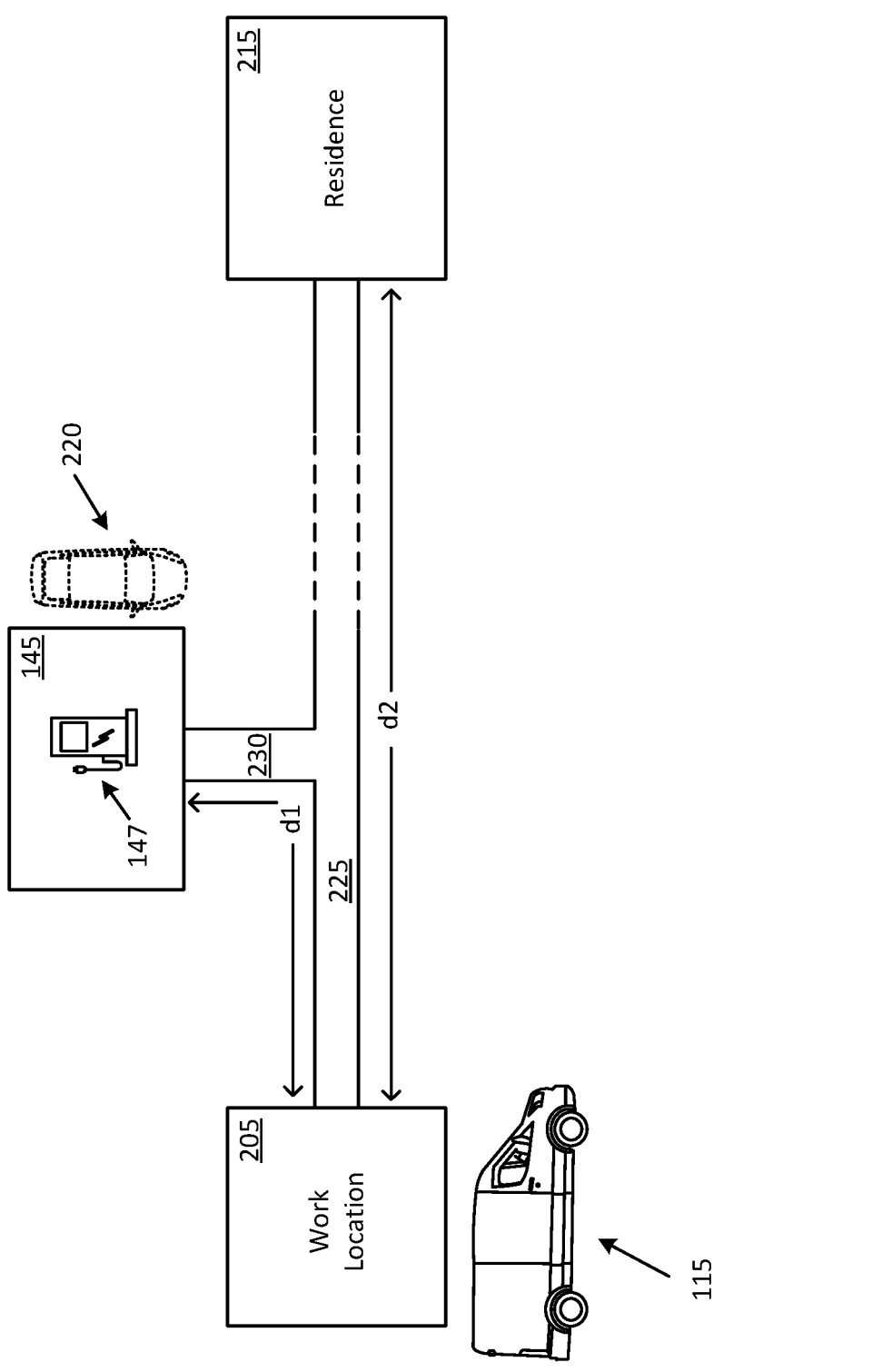
FIG. 2 illustrates an example scenario where the electric vehicle charging arrangement may be utilized in accordance with the disclosure.

FIG. 2 illustrates an example scenario where the electric vehicle 115 can utilize the electric vehicle charging arrangement system 100 in accordance with the disclosure. In the illustrated scenario, the electric vehicle 115 is a van that is one of a fleet of utility vehicles owned by a utility provider (electric company, phone company, civil engineering services company, etc.). The driver of the electric vehicle 115 can be an employee of the utility provider or a contractor who works for the utility provider. The electric vehicle 115 can be used for transporting various tools and supplies that the driver may use for executing his/her duties at the work location 205. The work location 205 is located at a distance "d2" from a residence 215 of the driver of the electric vehicle 115. At the end of the workday, the driver has two options. A first option is to use the electric vehicle 115 to travel back to his/her residence. This option raises several questions.

A first question pertains to availability of an electric vehicle charging station at the residence 215 for charging the electric vehicle 115 overnight for use the following day. In one case, the residence 215 may lack an electric vehicle charging station. In another case, the residence 215 may lack a garage and compel the driver to park the electric vehicle 115 on the street thereby exposing the electric vehicle 115 to vandalism and/or theft.

A second question pertains to an available amount of electric charge available in a battery system of the electric vehicle 115. In one case, the available amount of electric charge may be enough for the electric vehicle 115 to traverse the distance "d2" and reach the residence 215. In this case, if the residence 215 lacks an electric vehicle charging station, the driver has to take into consideration an amount of time that may be needed the following day to charge the electric vehicle 115 prior to setting out to the work location 205. Executing a charging procedure enroute to the work location 205 may not only be inconvenient and/or expensive, but may also be inefficient in terms of time management for the driver.

Consequently, and in accordance with the disclosure, the driver may opt to charge the electric vehicle 115 at the electric vehicle charging station 147 on the property 145 after completion of work at the work location 205. The charging procedure may be executed over the defined time slot during after-business hours of the second party (the business entity associated with the property 145). The distance "d1" between the work location 205 and the property 145 is smaller than the distance "d2" between the work location 205 and the residence 215. More particularly, the distance "d1" corresponds to a length of the road 230 added to a segment of the road 225, and the distance "d2" corresponds to a length of the road 225 in its entirety.

In an example implementation, the agreement between the first party and the second party allows the driver of the electric vehicle 115 to park a personal vehicle 220 at the property 145 during the workday of the driver, or at least during a part of the workday of the driver. The workday of the driver may extend over at least a part of business hours of the second party. The driver may arrange for the electric vehicle 115 to be charged at the electric vehicle charging station 147 over the defined time slot during after-business hours of the second party, and may use the personal vehicle 220 to travel to his/her residence 215. On the following day, the driver may use his/her personal vehicle 220 to travel from the residence 215 to the property 145, park the personal vehicle 220 at the property 145, and pick up the charged electric vehicle 115 to travel from the property 145 to the work location 205 (or to a different work location).

In some cases, the driver may opt to avoid using his/her personal vehicle to commute between the property 145 and the residence 215 but may instead opt to use a rental vehicle, a leased vehicle, a taxi, a ride-share vehicle, or a shuttle vehicle for this purpose.

Figure 3:
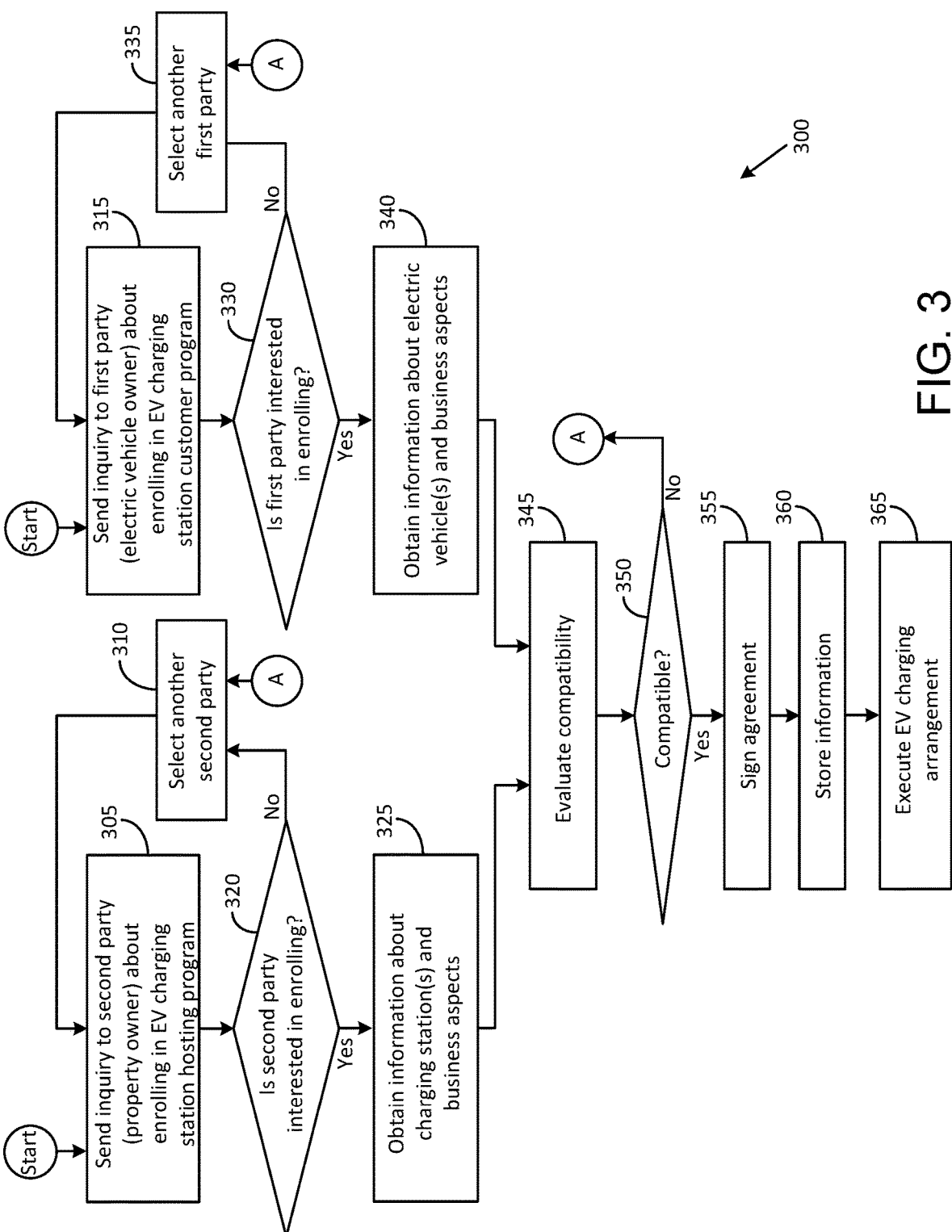
FIG. 3 illustrates a flowchart of a method to implement an electric vehicle charging arrangement in accordance with an embodiment of the disclosure.

FIG. 3 illustrates a flowchart 300 of a method to implement an electric vehicle charging arrangement in accordance with an embodiment of the disclosure. The flowchart 300 (and a flowchart 400 described below) illustrates a sequence of operations that can be implemented in hardware, software, or a combination thereof. In the context of software, the operations represent computer-executable instructions stored on one or more non-transitory computer-readable media such as a memory (not shown) in the computer 161, the memory 107 of the vehicle charging system computer 105, the memory 153 of the onsite computer 151, a memory (not shown) in the computer 131, and a memory (not shown) in the computer 141, that, when executed by one or more processors such as a processor (not shown) in the computer 161, the processor 106 of the vehicle charging system computer 105, the processor 152 of the onsite computer 151, a processor (not shown) in the computer 131, and a processor (not shown) in the computer 141 respectively, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

In an example embodiment, at least some of the operations indicated in the flowchart 300 and the flowchart 400 described below may be executed by use of a software application that is downloadable into a computer (desktop, server, etc.) and/or a personal device such as, for example, a smartphone, a laptop, a smart wearable, or a phablet (phone plus tablet). The personal device may be carried by, and operated upon, by the driver (or a passenger) of the electric vehicle. Some example operations that may be performed by use of the personal device can include providing information (security code, key code, license information, etc.), seeking help (for example, to locate an electric vehicle charging station or a personal vehicle on the property 145), and obtaining assistance (map display, visual cues, guidance, etc.).

The electric vehicle 115 and the various computers and operations described above with reference to FIG. 1 and FIG. 2 are referred to below in the form of examples and it must be understood that the description below of the flowchart 300 and flowchart 400 is equally applicable to various other vehicles, various other computers, and various other scenarios.

At block 305, a computer such as, for example, the computer 161 that is associated with the third party may be used by the administrator 160 to send out an inquiry. As described above, the third party can be any of various entities such as, for example, an agency, a company, a brokerage firm, an intermediary, or a contractor firm that arranges, executes, and administers an electric vehicle charging arrangement in accordance with an embodiment of the disclosure. In an alternative implementation, some or all of the actions indicated in various blocks of the flowchart 300 may be performed by the administrator 140 on the computer 141 and/or by the administrator 130 on the computer 131.

More particularly, in an example implementation, at block 305, the administrator 160 sends out an inquiry to a second party. The second party can be any of various entities owning one or more properties that include one or more electric vehicle charging stations such as, for example, an individual, a sole-proprietor of a business, or a business entity having a proprietary interest or ownership in one or more convenience stores, one or more gas stations, one or more restaurants, one or more hotels, one or more offices, one or more malls, and one or more strip malls.

The inquiry, which may be transmitted from the computer 161 to the computer 141 via the network 155, is directed at determining whether the second party is interested in enrolling in the electric vehicle charging arrangement as a host. In this example, the inquiry is received and evaluated by the administrator 140.

At block 320 a determination is made whether the second party is interested in enrolling in the electric vehicle charging arrangement as a host. In an example implementation, the determination may be made on the basis of a response received by the computer 161 from the computer 141 of the second party or a lack of response from the computer 141 of the second party. In an example application, the computer 161 is configured to execute a waiting period to wait for a response or a lack of response from the computer 141.

In an example scenario, the administrator 160 may either fail to respond to the inquiry or may transmit a negative response. In this example scenario, at block 310, another second party is selected and the actions indicated in block 305 and block 320 are repeated. In some cases, block 305, block 320, and block 310 may be executed recursively when no positive response is received from multiple second parties.

In an alternative scenario, the computer 161 may receive a positive response to the inquiry. For example, the administrator 140 may transmit to the computer 161, a response that indicates interest in enrolling in the electric vehicle charging arrangement as a host.

At block 325, the administrator 160 may request and obtain information about one or more properties owned and/or operated by the second party. The information can include, for example, information about one or more electric vehicle charging stations that are available for use by electric vehicles of the first party, monetary information, accessibility information, and times information. Information about an electric vehicle charging station can include, for example, characteristics of the charging station (rapid charger, ultra-rapid charger, fast charger, slow charger, and voltage type), location of the electric vehicle charging station, and operational status (functioning, inactive, being repaired, etc.). Monetary information can include, for example, payment and transaction details (fees, costs, terms of payment, bank info etc.). Accessibility information can include, for example, a gate code (if needed) and security measures (fenced, unfenced, gate, etc.). Times information pertains to items such as time slot, stipulated period of time, business hours, and holidays.

Turning now to block 315, the administrator 160 sends out an inquiry to a first party. The action indicated in block 315 may be performed either sequentially or substantially concurrently with the action indicated in block 305. As indicated above, the first party can either be an individual or can own and/or operate a fleet of vehicles such as, for example, a fleet of rental vehicles (Hertz®, Budget®, Avis®, Enterprise®, etc.), a ride-hail fleet (Uber®, Lyft®, etc.), a fleet of service vehicles (plumbing services company, electrical repair company, AC services company, construction company, etc.), or a fleet of utility vehicles (electric company, phone company, civil engineering services company, etc.). The inquiry, which may be transmitted from the computer 161 to the computer 131 via the network 155, is directed at determining whether the first party is interested in enrolling in the electric vehicle charging arrangement as a user.

At block 330 a determination is made whether the first party is interested in enrolling in the electric vehicle charging arrangement as a user of one or more electric vehicle charging stations. In an example implementation, the determination may be made on the basis of a response received from the first party or a lack of response from the first party.

The computer 161 may be configured to execute a waiting period to wait for a response or a lack of response. In an example scenario, the administrator 130 may either fail to respond to the inquiry or may transmit a negative response. In this example scenario, at block 335, another first party is selected and the actions indicated in block 315 and block 330 are repeated. In some cases, block 315, block 330, and block 335 may be executed recursively when no positive response is received from multiple first parties.

In an alternative scenario, the computer 161 may receive a positive response to the inquiry. For example, the administrator 130 may transmit to the computer 161, a response that indicates interest in enrolling in the electric vehicle charging arrangement.

At block 340, the administrator 160 may request and obtain information about one or more electric vehicles owned and/or operated by the first party. The information can include, for example, information about one or more electric vehicles that may require use of the one or more charging stations offered by the second party. The information about an electric vehicle can include, for example, a battery capacity of a battery provided in the electric vehicle, a type of battery (voltage, charge holding capacity, charging rate, etc.), and charging station type desired (rapid charger, ultra-rapid charger, fast charger, slow charger, etc.). The administrator 160 may also request information pertaining to financial matters (fees, costs, terms of payment, bank info etc.).

At block 345, information provided by the first party (at block 340) can be evaluated together with information provided by the second party (block 325). More particularly, the evaluation may be directed at ensuring compatibility, cooperation, efficiency, and costs for both parties.

At block 350, a determination is made whether the interests of the first party and that of the second party are compatible. In some cases, some of the interests of the first party and that of the second party may be found to be incompatible. In such cases, the third party may facilitate interaction between the first party and the second party to identify issues, resolve issues, mediate, and/or negotiate various terms.

If the incompatibility arises as a result of the first party and no agreement can be reached, the action indicated in block 335 and subsequent blocks can be executed. If the incompatibility arises as a result of the second party and no agreement can be reached, the action indicated in block 310 and subsequent blocks can be executed.

If the interests of the first party and that of the second party are found to be compatible, at block 355, an agreement is finalized between the first party and the second party. In an example implementation, the agreement may be finalized by use of legal documents such as, for example, a contract or a memorandum of understanding (MOU).

At block 360, information pertaining to the agreement and other information such as, for example, a gate code for entry into the property 145, an authentication code for authenticating electric vehicles entering a property, property information (ownership information, address information, etc.) and electric vehicle information (vehicle identification number (VIN), vehicle registration information, and/or vehicle ownership information) may be stored. The information may be stored, for example, in a database of the cloud computer 135 and made accessible to the first party and the second party.

At block 365, the electric vehicle charging arrangement is launched. Additional action such as administration tasks and maintenance tasks may also be identified and placed in operation.

Figure 4:
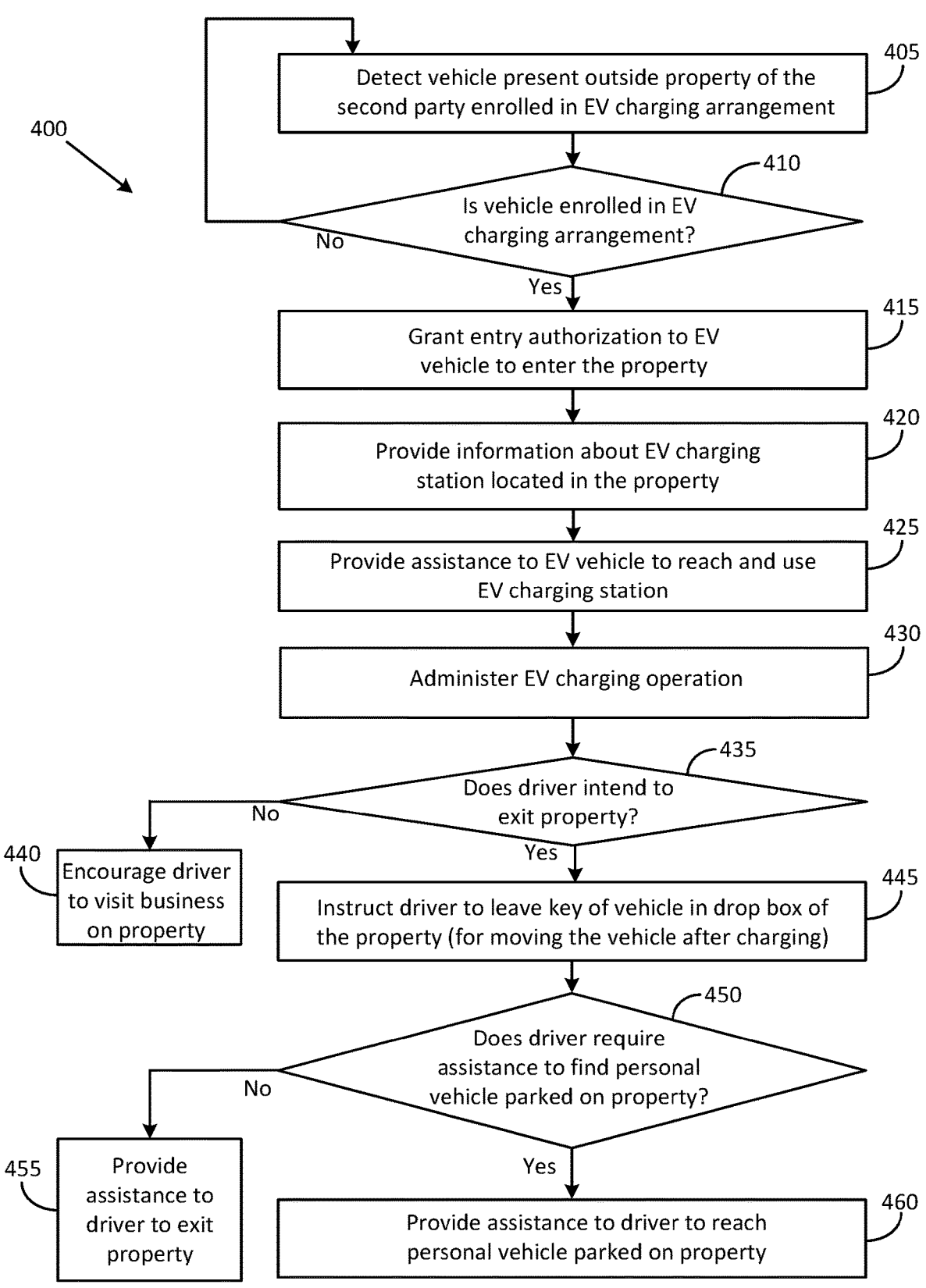
FIG. 4 illustrates a flowchart of a method to provide electric vehicle charging to an electric vehicle in accordance with an embodiment of the disclosure.

FIG. 4 illustrates a flowchart 400 of a method to provide electric vehicle charging to an electric vehicle in accordance with an embodiment of the disclosure. The description below refers to various objects shown in FIG. 1 and FIG. 2. However, it must be understood that the description is applicable to various other scenarios that involve charging of electric vehicles including, for example, in some scenarios where a property does not include a fence and/or security measures. In these scenarios, some of the blocks described in the flowchart 400 may be omitted or modified accordingly. Some other blocks may be added in other scenarios where such blocks are deemed relevant.

At block 405, a computer located in a property of the second party may detect an electric vehicle located outside the property. For example, the onsite computer 151 located in the property 145 may detect the electric vehicle 115 located outside the property 145. The detection may be carried out, for example, by evaluating one or more images captured by one or more cameras such as, for example, an image captured by the camera 156. In another scenario, the driver of the electric vehicle 115 may inform the onsite computer 151 of his/her arrival at the gate 154. The arrival information may be conveyed, for example, via a wireless signal and/or via an entry into the gate keypad 144 located near the gate 154.

At block 410, the onsite computer 151 executes a verification operation to verify that the electric vehicle 115 is enrolled in the electric vehicle charging arrangement in accordance with the disclosure. The verification operation can involve, for example, evaluating an image of the electric vehicle 115 (provided by the camera 156, for example). Evaluating the image can include detecting and identifying distinguishing features of the electric vehicle 115 (make, model, color, license plate, registration, etc.) and comparing information about the electric vehicle 115 against information stored in a database (such as, for example, information stored in a database of the cloud computer 135). In another scenario, the verification may be based on input provided by the driver of the electric vehicle 115 such as, for example, via an authentication code provided via a wireless signal (from a smartphone, for example) or in the form of an entry into the gate keypad 144.

At block 415, upon successfully authentication of the electric vehicle 115, the onsite computer 151 may transmit a signal to a gate activation system for activating a gate motor to open the gate 154 and allow entry of the electric vehicle 115 into the property 145. In an example scenario, the onsite computer 151 may activate one or more cameras in the property 145 to provide a live video feed. The live video feed may be used by the onsite computer 151 to monitor the movements of the electric vehicle 115 and to provide assistance to the driver of the electric vehicle 115.

At block 420, the onsite computer 151 may provide to the driver of the electric vehicle 115, information about the electric vehicle charging station 147 located in the property 145. The information can include, for example, a description of the electric vehicle charging station 147 and a location of the electric vehicle charging station 147 in the property 145. The driver of the electric vehicle 115 may obtain additional information from the onsite computer 151 (if so desired) and/or from one or more other sources such as, for example, from the cloud computer 135 and/or the computer 131. The additional information can include, for example, various details about the electric vehicle charging arrangement (time slot, fees, authorization codes, times, rules, etc.).

At block 425, the onsite computer 151 provides assistance to the electric vehicle 115 to reach the electric vehicle charging station 147 in the property 145. The assistance can be provided in various ways.

In a first example scenario, the assistance may be provided in the form of visual cues. Visual cues may be particularly useful at night during which a time slot may be assigned. The lighting cues can involve, for example the use of spotlights, floodlights, directional arrow lights, flashing lights, and/or colored lights. Visual clues can also include icons, maps, and graphics that may be displayed or projected on a display screen of an infotainment system in the electric vehicle 115 or on a display screen of a personal device carried by the driver. The content displayed on the display screen may be provided by the vehicle charging system computer 105 either independently or in cooperation with the onsite computer 151 in the property 145 (via wireless communication between the vehicle charging system computer 105 and the onsite computer 151).

In a second example scenario, the assistance may be provided in the form of audible instructions via an audio system of the infotainment system in the electric vehicle 115, one or more loudspeakers in the property 145, and/or via the communication system 158 that may be located near the electric vehicle charging station 147. The communication system 158 may be further used to provide instructions for use of the electric vehicle charging station 147 after the electric vehicle 115 is parked in the parking spot 146. In some cases, the onsite computer 151 may instruct a vehicle (other than the electric vehicle 115) that is parked in the parking spot 146 to vacate the parking spot 146. The other vehicle may be detected based on signals received by the onsite computer 151 from the object detector 157 and/or via images captured by the camera 148. In some cases, direction may be provided by an on-site security guard.

At block 430, the onsite computer 151 may execute various administration tasks associated with the use of the electric vehicle charging station 147 by the driver of the electric vehicle 115. The administration tasks can include monitoring the charging operation, logging usage information, operating upon financial information (fees, rates, etc.), and any usage violations (overcharging, overstaying, etc.).

At block 435, a determination is made whether the driver of the electric vehicle 115 intends to exit the property 145. In one example scenario, the driver may decide to stay on the property 145 while the electric vehicle 115 is being charged at the electric vehicle charging station 147. In this case, the driver may wait in the electric vehicle 115 or may visit a place of business located in the property 145 such as, for example, a convenience store or a restaurant that is located in the property 145. Encouraging the driver to remain in the property 145 can be one way of providing business to the convenience store or the restaurant that is located in the property 145. The encouragement action (indicated in block 440) may be provided, for example, in the form of advertisements and promotions displayed upon various objects in the property 145 (such as, for example, on a display screen provided in the electric vehicle charging station 147) or on the personal device carried by the driver.

In another example scenario, the driver may decide to head out of the property 145 while the electric vehicle 115 is being charged and travel to his/her residence 215 (illustrated in FIG. 2). In this case, at block 445, the onsite computer 151 may provide visual or audible instructions to the driver to leave the key to the electric vehicle 115 at a designated location in the property 145. The designated location can be, for example, a drop box located near the electric vehicle charging station 147 or elsewhere on the property 145. The key may be used by personnel at the property 145 (a security guard, for example) to move the electric vehicle 115 from the parking spot 146 to another parking spot so as to make the parking spot 146 available for use by people visiting the property 145 later that night or the next day. The people visiting the property 145 can be, for example, customers of a convenience store or restaurant that may be located on the property 145. In some cases, the electric vehicle 115 can be an autonomous vehicle. In such cases, the onsite computer 151 may seek, obtain, and store information (operational codes, for example) that can be used by the personnel at the property 145 to move the autonomous electric vehicle 115 from the parking spot 146 to another parking spot.

At block 450, a determination is made whether the driver requires assistance to locate a personal vehicle of the driver that may be parked in the property 145. One example of a personal vehicle is the personal vehicle 220 shown in FIG. 2 and described above. If assistance is sought, at block 460, the onsite computer 151 may provide audible and/or visual assistance to the driver to locate his/her personal vehicle on the property 145.

If the driver does not seek such assistance, at block 455, the onsite computer 151 may provide assistance to the driver to exit the property. In an example scenario, the onsite computer 151 may provide assistance in the form of contacting a ride-hail agency, a shuttle service, a vehicle leasing agency, or a taxicab service, and providing navigation assistance to a ride-hail vehicle or a taxicab to reach a spot on or outside the property 145 where the driver can board the ride-hail vehicle or taxicab.

Figure 5:
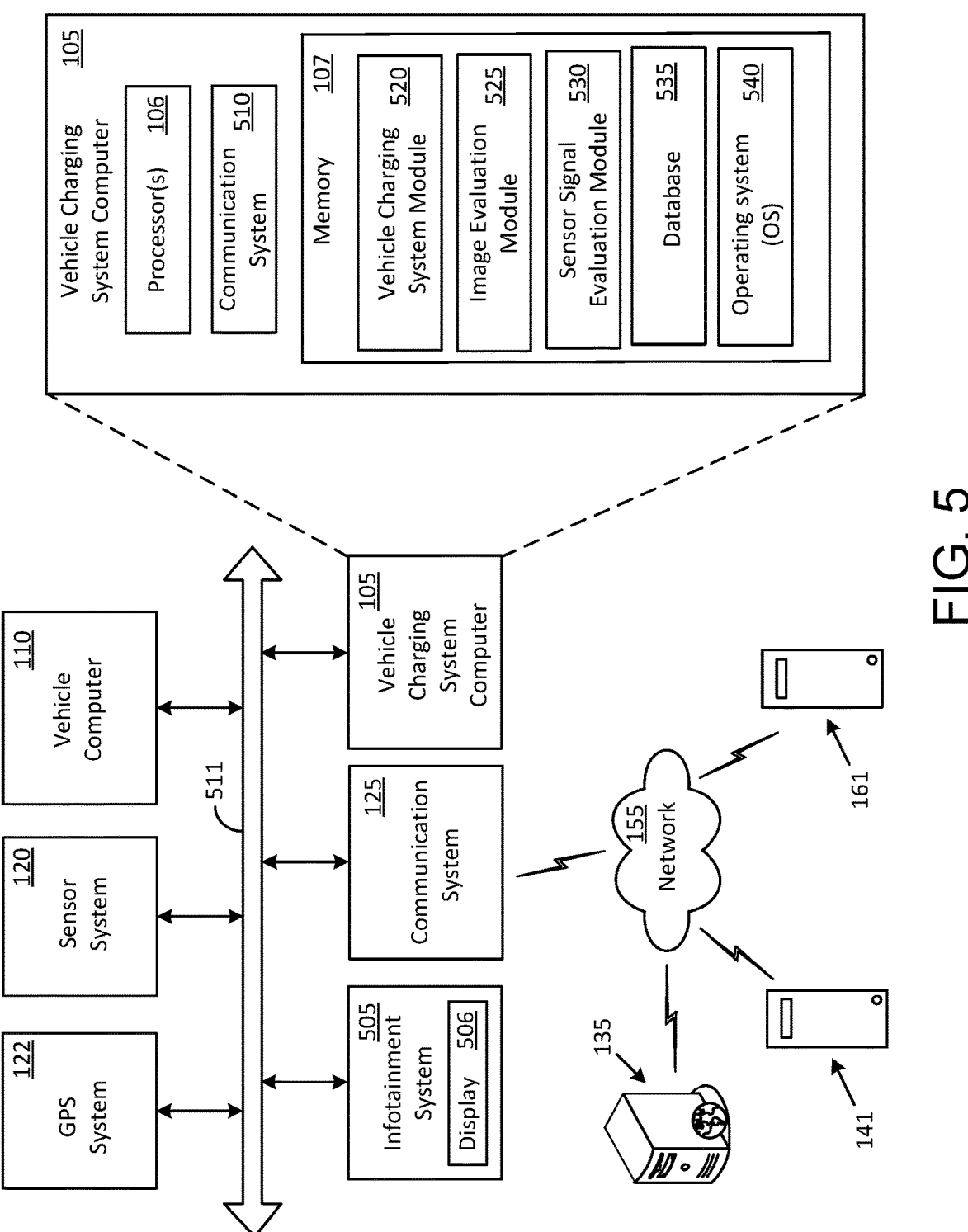
FIG. 5 shows some example components that may be provided in a vehicle in accordance with an embodiment of the disclosure.

FIG. 5 shows some example components that may be included in the electric vehicle 115 in accordance with an embodiment of the disclosure. The example components may include the communication system 125, the vehicle computer 110, an infotainment system 505, the sensor system 120, the GPS system 122, and the vehicle charging system computer 105.

The various components are communicatively coupled to each other via one or more buses such as, for example, a bus 511. The bus 511 may be implemented using various wired and/or wireless technologies. For example, the bus 511 can be a vehicle bus that uses a controller area network (CAN) bus protocol, a Media Oriented Systems Transport (MOST) bus protocol, and/or a CAN flexible data (CAN-FD) bus protocol. Some or all portions of the bus 511 may also be implemented using wireless technologies such as Bluetooth®, Bluetooth® Low Energy (BLE), Ultra-Wideband, Wi-Fi, Zigbee®, or near-field-communications (NFC). For example, the bus 511 may include a Bluetooth® communication link that allows the vehicle charging system computer 105 and the sensor system 120 to wirelessly communicate with each other and/or the vehicle charging system computer 105 to communicate with the vehicle computer 110.

The communication system 125 can include wired and/or wireless communication devices mounted in or on the electric vehicle 115 in a manner that support various types of communications such as, for example, communications between the vehicle charging system computer 105 and the vehicle computer 110. The communication system 125 may also allow the vehicle charging system computer 105 to communicate with devices located outside the electric vehicle 115, such as, for example, the computer 131, the computer 141, the computer 161, and the cloud computer 135.

In an example implementation, the communication system 125 can include a single wireless communication unit that is coupled to a set of wireless communication nodes. In some cases, the wireless communication nodes can include a Bluetooth® low energy module (BLEM), a Bluetooth® low energy antenna module (BLEAM), or a Bluetooth®, Ultra-Wideband, and NFC module (BUN).

The infotainment system 505 can include a display 506 having a GUI for carrying out various operations. The GUI may be used, for example, to allow the onsite computer 151 in the property 145 to provide information to the driver of the electric vehicle 115 and/or for the driver to seek information from the onsite computer 151.

The sensor system 120 can include various types of devices such as, for example, a video camera, a digital camera, an infrared camera, an object detector, a distance sensor, a proximity sensor, an audio sensor, a light detection and ranging (LIDAR) device, a radar device, and/or a sonar device.

The GPS system 122 can include a GPS device that communicates with a GPS satellite for obtaining location information, including, for example, a location of the electric vehicle 115. The location information of the electric vehicle 115 may be utilized by various entities, such as, for example, the computer 131, the computer 141, the computer 161, and the cloud computer 135 to locate the electric vehicle 115 at various times.

The vehicle charging system computer 105 may include the processor 106, a communication system 510, and a memory 107. The communication system 510 can include various types of transceivers that allow the vehicle charging system computer 105 to communicate with the vehicle computer 110 (via the bus 511) and other computers (wirelessly via the network 155).

The memory 107, which is one example of a non-transitory computer-readable medium, may be used to store an operating system (OS) 540, a database 535, and various code modules such as a vehicle charging system module 520, an image evaluation module 525, and a sensor signal evaluation module 530. The code modules are provided in the form of computer-executable instructions that are executed by the processor 106 to enable the vehicle charging system computer 105 to perform various operations in accordance with the disclosure. The vehicle charging system module 520 can be executed for example, by the processor 106, to perform some of the operations indicated in the flowchart 300 and/or the flowchart 400 described above.

Execution of some of these operations can include the use of the image evaluation module 525 in order to evaluate various types of images such as, for example, images captured by the camera 121. The sensor signal evaluation module 530 may be used by the vehicle charging system module 520 to evaluate various types of sensor signals such as, for example, a sensor signal received from the object detector 157 in the parking spot 146.

The database 535 may be used to store various types of data such as, for example, information associated with the electric vehicle charging arrangement.

It must be understood that in various embodiments, actions performed by the processor 106 of the vehicle charging system computer 105 can be supplemented, complemented, replicated, or replaced by actions performed by other processors in other computers, such as, for example, a processor in the computer 131 and/or the processor 152 in the onsite computer 151 located in the property 145. The actions performed by such other computers may be carried out in cooperation with the processor 106 of the vehicle charging system computer 105.

Figure 6:
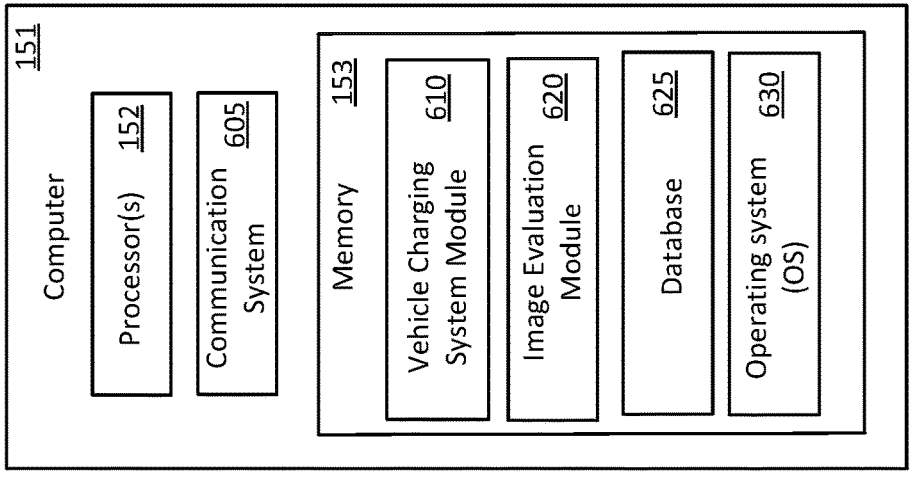
FIG. 6 shows some example components that may be included in a computer of a second party providing electric vehicle charging facilities to an electric vehicle of a first party in accordance with an embodiment of the disclosure.

FIG. 6 shows some example components that may be included in the onsite computer 151 in accordance with an embodiment of the disclosure. Some of the description provided below with reference to the onsite computer 151 such as, for example, description associated with a vehicle charging system module 610 and a database 625 is equally applicable to the computer 131 and the computer 141 and must be understood accordingly.

The onsite computer 151 may include the processor 152, a communication system 605, and the memory 153. The communication system 605 can include one or more wireless transceivers that allow the onsite computer 151 to communicate with devices such as, for example, the vehicle charging system computer 105 in the electric vehicle 115, the computer 131, the computer 161, the computer 141, and the cloud computer 135.

The memory 153, which is another example of a non-transitory computer-readable medium, may be used to store an operating system (OS) 630, a database 625, and various code modules such as a vehicle charging system module 610 and an image evaluation module 620. The code modules are provided in the form of computer-executable instructions that are executed by the processor 152 to enable the onsite computer 151 to perform various operations in accordance with the disclosure. The vehicle charging system module 610 can be executed for example, by the processor 152, to perform some of the operations indicated in the flowchart 300 and/or the flowchart 400 described above.

Execution of some of these operations can include the use of the image evaluation module 620 in order to evaluate various types of images such as, for example, images captured by the camera 156.

The database 625 may be used to store various types of data such as, for example, information associated with the electric vehicle charging arrangement and information about various vehicles such as, for example, the electric vehicle 115.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 106, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 107, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

determining, by a computer, located on a property, a presence of an electric vehicle outside the property at a first time;

determining, by the computer and based on an agreement between a first party associated with the electric vehicle and a second party associated with the property, that the electric vehicle is authorized to enter the property;

determining, by the computer, that the first time is within a time slot during which the electric vehicle is authorized to enter the property;

granting, by the computer, to the electric vehicle, an authorization to enter the property;

providing, by the computer to a driver of the electric vehicle, information about an electrical vehicle charging station location on the property;

granting, by the computer, to the electric vehicle, access to the electric vehicle charging station during the time slot;

transmitting, by the computer and based on granting, to the electric vehicle, access to the electric vehicle charging station, a gate code to a gate activation system that is configured to open a gate upon verification of the gate code;

opening, by the gate activation system, the gate in response to receiving and verifying the gate code;

providing, by the computer, assistance to the electric vehicle to enable the electric vehicle to reach the electric vehicle charging station, wherein the assistance comprises visual cues such as spotlights, floodlights, directional arrow lights, flashing lights, or colored lights;

determining, by the computer and based on at least one of: a signal received by the computer or an image captured by a camera, that a different electric vehicle is parked in a parking space associated with the electric vehicle charging station; and instructing, by the computer and based on the determination that the different electric vehicle is parked in the parking space, the different electric vehicle to vacate the parking space.

2. The method of claim 1, wherein the second party is a business entity, and wherein the time slot is outside of business hours of an activity performed by the business entity on the property.

3. The method of claim 1, wherein the agreement stipulates that the time slot is available for use on a repetitive basis over a stipulated period of time.

4. The method of claim 3, wherein the time slot exists during at least one of a partial day period or an overnight period, and wherein the method further comprises:

granting permission to park a second vehicle of the driver of the electric vehicle at the property of the second party during at least a part of a day.

5. A method comprising:

detecting, by a computer associated with a property, presence of an electric vehicle at a first location outside the property, the first location corresponding to an entrance to the property;

determining, by the computer, a current time;

determining, by the computer, that the current time is within a time slot during which the electric vehicle is allowed to enter the property;

determining, by the computer, that the electric vehicle is enrolled in a vehicle charging agreement associated with the property;

granting, by the computer, access to the electric vehicle to enter the property for charging the electric vehicle at an electric vehicle charging station located on the property; and transmitting, by the computer and based on granting, to the electric vehicle, access to the electric vehicle charging station, a gate code to a gate activation system that is configured to open a gate upon verification of the gate code;

opening, by the gate activation system, the gate in response to receiving and verifying the gate code;

providing, by the computer, assistance to the electric vehicle to enable the electric vehicle to reach the electric vehicle charging station, wherein the assistance comprises visual cues such as spotlights, floodlights, directional arrow lights, flashing lights, or colored lights;

determining, by the computer and based on at least one of: a signal received by the computer or an image captured by a camera, that a different electric vehicle is parked in a parking space associated with the electric vehicle charging station; and instructing, by the computer and based on the determination that the different electric vehicle is parked in the parking space, the different electric vehicle to vacate the parking space.

6. The method of claim 5, wherein the time slot is outside of business hours of a second party associated with the property.

7. The method of claim 6, wherein the time slot is available for use of the electric vehicle on a repetitive basis over a stipulated period of time.

8. The method of claim 7, wherein the stipulated period of time is defined as one of a number of hours, number of days, a number of months, or a number of years.

9. The method of claim 5, wherein the property is one of a business establishment or a commercial establishment, and wherein a second party associated with the property is one of an individual having an ownership right to the property, a group of individuals having the ownership right to the property, a business entity having the ownership right to the property, or a commercial entity having the ownership right to the property.

10. A system comprising:

a first computer comprising:

a first memory that stores computer-executable instructions; and a first processor configured to access the first memory and execute the computer-executable instructions to perform operations comprising:

determining a presence of an electric vehicle outside a property at a first time, the first computer being associated with the property;

determining, based on an agreement between a first party associated with an electric vehicle and a second party associated with the property, that the electric vehicle is authorized to enter the property at the first time;

granting access to the electric vehicle to enter the property;

determining that the first time is within a time slot in which the electric vehicle is authorized to use a charging station on the property;

granting, to the electric vehicle, access to the charging station on the property during a time slot;

transmitting, based on granting, to the electric vehicle, access to the electric vehicle charging station, a gate code to a gate activation system that is configured to open a gate upon verification of the gate code; and opening, by the gate activation system, the gate in response to receiving and verifying the gate code;

providing assistance to the electric vehicle to enable the electric vehicle to reach the charging station, wherein the assistance comprises visual cues such as spotlights, floodlights, directional arrow lights, flashing lights, or colored lights;

determining, based on at least one of: a signal received by the computer or an image captured by a camera, that a different electric vehicle is parked in a parking space associated with the electric vehicle charging station; and instructing, based on the determination that the different electric vehicle is parked in the parking space, the different electric vehicle to vacate the parking space.

11. The system of claim 10, wherein the time slot is outside of business hours of an activity performed by the second party on the property and wherein the agreement stipulates that the time slot is available for use on a repetitive basis over a stipulated period of time.

12. The system of claim 11, wherein the stipulated period of time is defined as one of a number of hours, number of days, a number of months, or a number of years.

13. The system of claim 10, wherein the first computer is owned by the second party, and wherein granting the access includes transmitting a gate code to the electric vehicle, and wherein the system further comprises:

a second computer comprising:

a second memory that stores computer-executable instructions; and a second processor configured to access the second memory and execute the computer-executable instructions to perform operations comprising:

receiving the gate code transmitted by the first computer; and transmitting the gate code to a gate activation system that is configured to open a gate upon verification of the gate code.

14. The system of claim 13, wherein the electric vehicle is an autonomous electric vehicle, wherein the second computer is located in the autonomous electric vehicle, and wherein the second processor of the second computer is further configured to access the second memory and execute the computer-executable instructions to perform operations comprising:

parking the autonomous electric vehicle adjacent to the charging station; and executing a charging operation to charge a battery of the autonomous electric vehicle.

15. The system of claim 14, wherein autonomously executing the charging operation comprises at least one of parking the autonomous electric vehicle over a charging pad of the charging station or operating a robotic arm to couple a charging cable of the charging station to a battery plug in the autonomous electric vehicle.

16. The method of claim 1 further comprising:

determining, by the computer, that the driver needs assistance to locate the electric vehicle charging station; and providing, by the computer, assistance to the electric vehicle to reach the electric vehicle charging station.

17. The method of claim 5, further comprising:

determining, by the computer, that a driver of the electric vehicle intends to exit the property; and providing, by the computer to the driver, visual or audible instructions to leave a key of the electric vehicle at a designated location on the property.

18. The method of claim 17, further comprising:

determining, by the computer, that the driver needs assistance to locate another vehicle parked on the property; and providing, by the computer to the driver, visual or audible assistance to locate the other vehicle parked on the property.

* * * * *